United States Patent [19]

Buck et al.

[11] 4,375,666

[45] Mar. 1, 1983

[54] ELECTRONIC GUESSING GAME

[75] Inventors: Gordon H. Buck, Torrance; Scott A. Ferdinand, Hermosa Beach; George J. Klose, Lomita, all of Calif.

[73] Assignee: Mattel, Inc., Hawthorne, Calif.

[21] Appl. No.: 222,099

[22] Filed: Jan. 2, 1981

[51] Int. Cl.³ .......................... G06F 15/44; A63F 9/00

[52] U.S. Cl. .................................... 364/410; 273/1 E; 273/138 A

[58] Field of Search ........................ 364/410, 411, 412; 340/323 R; 273/1 E, 85 G, 86 B, 138 A, 237, DIG. 28

[56] References Cited

U.S. PATENT DOCUMENTS 4,206,920 6/1980 Weatherford et al. ......... 273/138 A

FOREIGN PATENT DOCUMENTS 53-14049 2/1978 Japan .................................. 273/1 E 2026872 2/1980 United Kingdom ............... 273/1 E

*Primary Examiner*—Jerry Smith

*Attorney, Agent, or Firm*—Reagin & King

[57] ABSTRACT

An electronic guessing game is disclosed which includes a keyboard for entering numbers, and a light and speaker for producing a variety of visual and audible signals. A prize is also provided within a transparent housing. A first player enters a secret number by means of the keyboard. A second player then enters his guess at the secret number using the same keyboard. The second player attempts to retrieve the prize by reaching into the transparent housing. The position of the players hand is detected by a group of photocells. If the player's guess is not equal to the secret number, the game will generate an error signal and the player must withdraw his hand. The closer the player's guess is to the secret number the closer he may approach the prize before the error signal is sounded. If the player guesses the secret number within a preallotted time interval, he may retrieve the prize. A mode of operation is also disclosed in which the game chooses the secret number by means of a random number generator. Thus the guessing game may be played with only one player.

5 Claims, 10 Drawing Figures

ELECTRONIC GUESSING GAME

BACKGROUND OF THE INVENTION

This invention relates to games and, more particularly, to electronic guessing games.

Guessing games have a long history. Most such games are played with two players. One player chooses a secret word or number which is to be guessed by the other player. The secret word or number is typically written on a piece of paper which is kept from the sight of the person making the guess. After each guess is made the opposing player offers a hint to direct the guessing player toward a more accurate guess. The game is terminated when either the guessing player finally guesses the secret word or number or he has used up either a predetermined number of guesses or a preallotted length of time.

Such guessing games provide only a limited amount of entertainment for the players. In the past, guessing games have lacked the excitement and stimulation necessary to maintain the player's interest. Consequently, players quickly tire of playing such games.

Recent improvements in electronic computer circuitry have led to the construction of a variety of electronic games. In these electronic games the person may play against an electronic computer, eliminating the necessity for other players. These games are also capable of producing a variety of visual and audible signals.

Accordingly, it is an object of the present invention to provide an electronic guessing game.

It is another object of this invention to provide an electronic guessing game which may be played with only one player.

It is another object of this invention to provide an electronic guessing game which provides a variety of visual and audible signals to heighten the enjoyment of the game.

SUMMARY OF THE INVENTION

The foregoing and other objects of the invention are accomplished by an electronic guessing game which has an exterior housing mounting a keyboard for entering a secret number. The keyboard is also used for entering numbers which are the player's guess at the secret number.

The housing also includes a transparent cover having an opening at one end to permit a player to insert his hand within the cover. At the opposite end of and within the cover is a prize which is awarded to a winning player. The prize may be in the form of a simulated expensive object such as a jewel, diamond ring or the like. An object of the game is to be able to reach through the opening of the transparent cover and obtain the prize. Located along the path between the opening of the cover and the prize are a series of five photocells. As the player's hand moves toward the prize, he sequentially blocks the light path to each of the photocells. Output signals from each of the photocells are connected to internal electronic circuitry which is programmed to detect the position of the player's hand. A light and a speaker are also provided in the electronic guessing game to produce a variety of visual and audible signals.

The game of the present invention may be played with either one or two players. When played with two players a first player enters a secret number by depressing appropriate keys on the keyboard. Obviously, this number is not divulged to the other player. In turn, the second player attempts to guess the secret number. He enters his guess by means of the same keys on the keyboard. After entering his guess, the player reaches into the housing in an attempt to reach the prize.

The electronic guessing game is capable of accepting secret numbers from one to two thousand. When the player's hand covers the first photocell, and if his guess is not within five hundred numbers of the secret number, the game will output a loud siren sound indicating his guess is incorrect. The player must now input a second guess via the keyboard. If his guess is within five hundred numbers of the secret number, the player may move his hand past the first photocell. When his hand covers the second photocell, and if his guess is not within two hundred of the secret number, a siren sound will again be emitted indicating he has not guessed the secret number. The process of sequentially guessing and entering numbers and moving one's hand toward the prize continues in this fashion.

When the third photocell is covered, the siren sound will be output if the player's guess is not within one hundred numbers of the secret number. The fourth photocell triggers the siren sound if the player's guess is not within fifty numbers of the secret number. The fifth and last photocell is located closest to the prize and will trigger the siren sound if the player's guess is within fifty numbers but is not within ten numbers of the secret number.

If the player's guess is within ten numbers of the secret number the fifth photocell of the electronic guessing game will trigger one of two audible tones to give the player a hint for his next guess. A high pitched tone will be emitted if his guess is greater than but within ten numbers of the secret number and a low pitched tone will be emitted if his guess is less than but within ten numbers of the secret number. If the player guesses the secret number he may move his hand to, and retrieve the prize. At the same time the electronic guessing game will play a winning tune.

When the player enters his first guess in the aforementioned sequence, a timer is initiated within the electronic circuitry of the guessing game. If the player does not guess the secret number within the predetermined setting of the timer, he loses the game as indicated by a losing sound and a light.

The electronic game of the present invention may also be played with only one player. The electronic circuitry within the guessing game has the capability of randomly selecting a secret number by means of an internally programmed random number generator. Thus at the beginning of the game a single player may elect to have electronic circuitry of the game automatically select the secret number as opposed to having a second player choose the secret number.

These and other objects, features and advantages of the invention will become apparent by reference to the specification taken in conjunction with the drawings in which like elements are referred to by like reference designations throughout the several views.

DESCRIPTION OF THE PREFERRED EMBODIMENT

Figure 1:
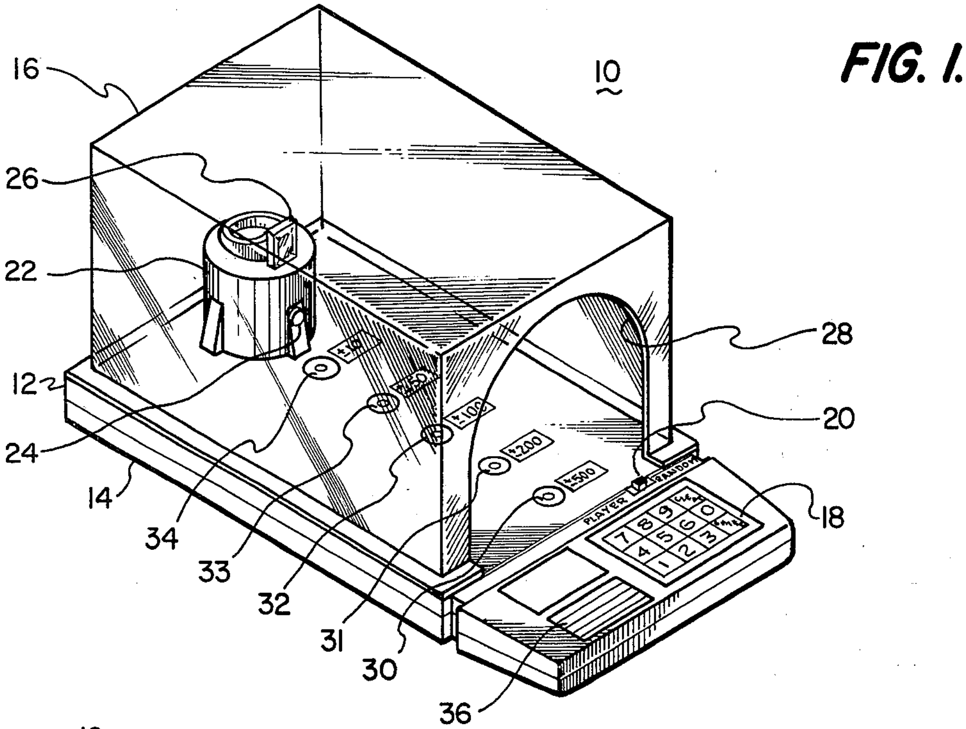
FIG. 1 is a perspective view of an electronic guessing game in accordance with the present invention.
Figure 2:
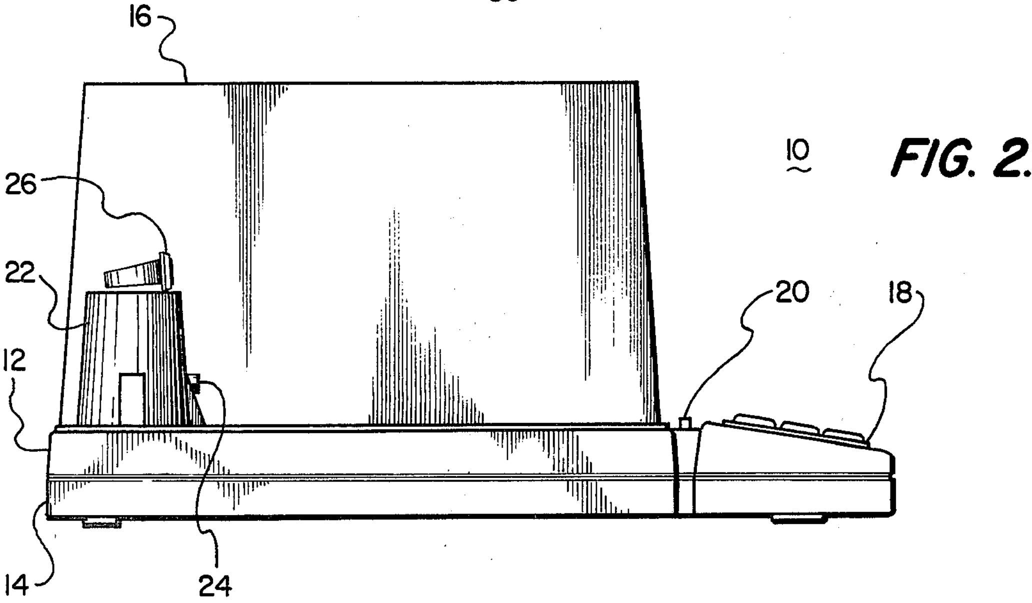
FIG. 2 is a side plan view of the game of FIG. 1.
Figure 3:
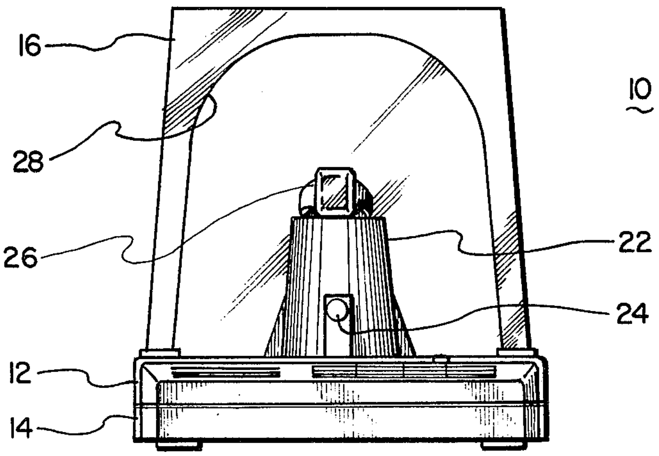
FIG. 3 is a front plan view of the game of FIG. 1.

Referring now to the drawings and, more particularly to FIGS. 1–3, there are shown perspective, side and front views respectively of an electronic guessing game 10 constructed in accordance with this invention. The game 10 includes an upper housing 12, a lower housing 14 and a transparent cover 16, each of which may be constructed of a moldable plastic material. The guessing game 10 also includes a keyboard 18 having ten number keys labeled from zero through nine, a Clear key and an Enter key. The keyboard 18 is used to enter the secret number as well as subsequent guesses. A three-position slide switch 20 is provided to energize the game and to select the mode of operation of the game. The switch 20 has a Player position, a Random position and a center Off position. If the game is to be played by a single player, the player moves the switch 20 to the Random position. In this mode of operation, the secret number is selected by a random number generator within the electronic circuitry of the game 10 as described below. If two players are available, the first player moves the switch 20 to the Player position, permitting him to enter a secret number via the keyboard 18.

As shown in FIGS. 1–3 a pedestal 22 is mounted at one end of the upper housing 12. A light 24 projects from the base of the pedestal 22. The light 24 is used to provide a variety of visual signals during the play of the game. Resting on the top surface of the pedestal 22 is a prize 26 to be retrieved by the winning player. As shown in FIGS. 1–3 the prize is represented by a a simulated diamond ring.

The transparent cover 16 is mounted on top of the upper housing 12, enclosing the pedestal 22 and the prize 26. At one end of the cover 16 opposite the pedestal 22 is an opening 28. With one hand a player may reach through the opening 28 into the interior of the cover 16 in an effort to retrieve the prize 26.

As shown in FIG. 1 there are located five photocells 30–34 projecting through the upper housing 12 along the path from the opening 28 to the prize 26. The photocells 30–34, which may be in the form of light sensitive resistors, are illuminated by an external light source, such as ambient room light, which is directed to impinge on the photocells 30–34 through the transparent cover 16. From FIG. 1 it can be seen that as a player moves his hand through the opening 28 toward the prize 26, his hand will sequentially block the light received by the photocells 30–34. As described below, output signals from the photocells 30–34 are used by the electronic circuitry within the game 10 to sense the position of the player's hand. The electronic guessing game 10 also includes a speaker (not shown in FIG. 1) which is located beneath a grill 36 on the top side of the upper housing 12.

Figure 4:
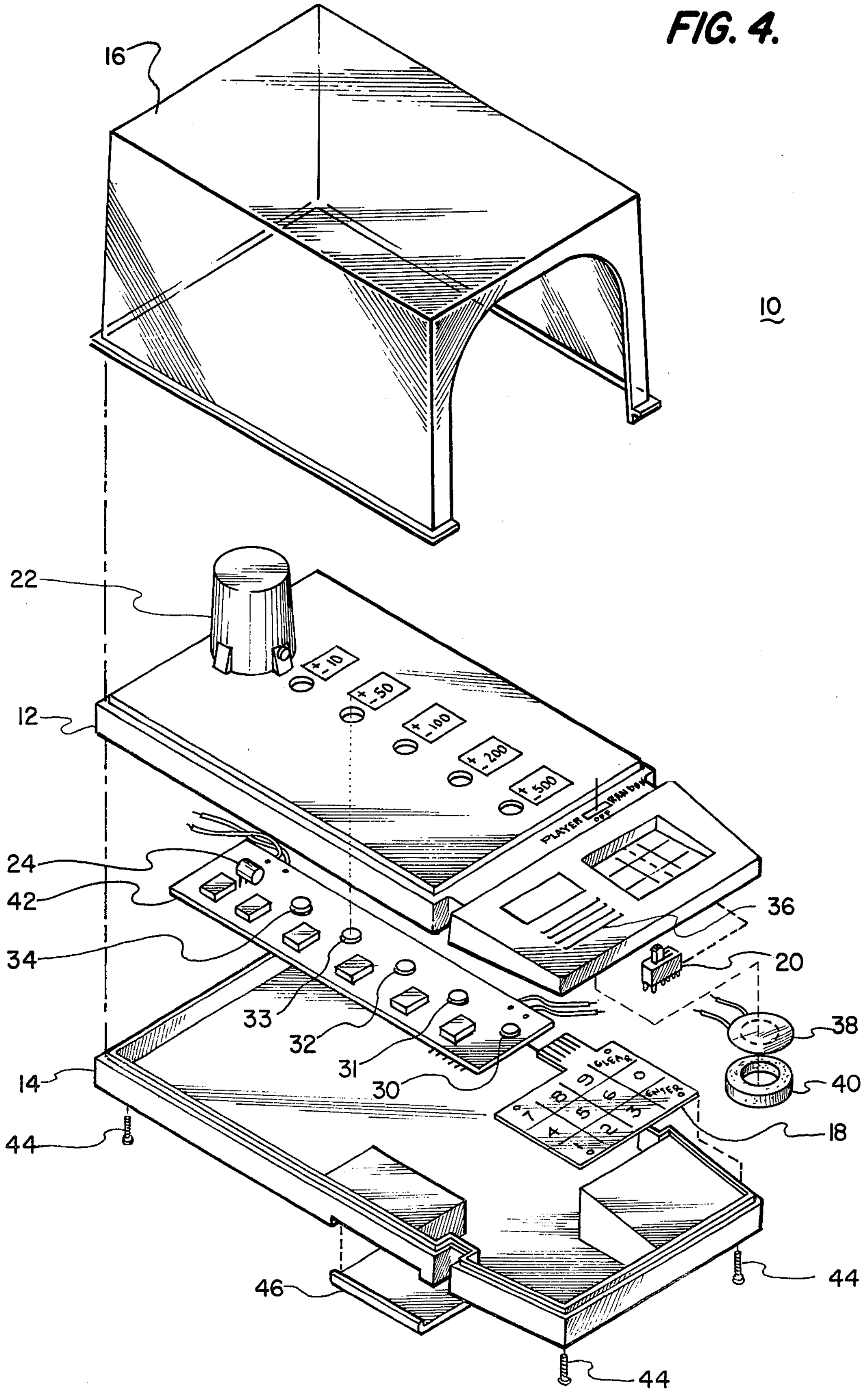
FIG. 4 is an exploded perspective view of the electronic guessing game of FIG. 1 showing the internal construction of the game.

Referring now to FIG. 4 there is shown an exploded perspective view of the game 10 showing the various components mounted within the upper and lower housings 12 and 14 respectively. As shown in FIG. 4 the switch 20 and a speaker 38 in the form of a piezoceramic disk are mounted to the upper housing 12. The speaker 38 may be held in place by means of a suitable spacer 40. Mounted within the housing sections 12 and 14 are the keyboard 18 and a printed circuit board 42.

Mounted to the circuit board 42 are the photocells 30–34, the light 24 and a variety of electronic components to perform the functions of the guessing game 10. The photocells 30–34 may be in the form of cadmium sulfide photo resistors and the light 24 may be in the form of a light emitting diode (LED). When the upper housing 12 is fastened to the lower housing 14 by means of the screws 44, the photocells 30–34 and the lights 24 project through suitable apertures in the upper housing 12 as shown in FIG. 4. The transparent cover 16 may be fastened to the upper housing 12 by means of a snug fit as is well known to those skilled in the art. On the bottom of the lower housing 14 is a door 46 to provide access for insertion of conventional batteries such as a nine volt transistor battery to operate the circuitry contained within the housing halves 12 and 14 of the game 10. The operation of the electronic guessing game described thus far is as follows.

Referring again to FIG. 1 and assuming the game 10 is to be played by a single player, the player moves the switch 20 from the Off position to the Random position and depresses the Clear key on the keyboard 18. The electronic circuitry within the game 10 will generate a random number between one and two thousand and will store this random number as the secret number to be guessed by the player. A low pitched beep tone is generated by the speaker 38, and the light 24 is turned to on to indicate that a secret number has been chosen and that the game 10 is ready for the player's first guess.

The player now enters his first guess by depressing the appropriate number keys on the keyboard 18. As each number key is depressed a high pitched beep tone is generated by the speaker 38. When the player has completed the input of the first guess, he depresses the Enter key on the keyboard 18. A high pitched beep tone is generated by the speaker 38, the light 24 is turned off, and a three tone abrupt sound is generated. The abrupt sound indicates to the player that he should attempt to retrieve the prize 26 by inserting his hand within the opening 28 of the cover 16. At the same instant, a timer is initiated within the electronic circuitry of the game 10. To win the game the player must guess the secret number before the timer reaches a predetermined time interval. In the preferred embodiment this time interval is set to approximately three minutes.

As the player's hand enters the opening 28 within the cover 16 the ambient room light is blocked from the first photocell 30. If the player's guess was not within plus or minus five hundred numbers of the secret number, a loud two-tone siren sound is generated by speaker 38. The player must now withdraw his hand from the opening 28 and reenter a second guess. The second guess is input after depressing the Clear key, accompanied by the low pitched beep sound from the speaker 38. The player then inputs his second guess via the number keys and enters his guess by depressing the Enter key on the keyboard 18. As described above, a high pitched beep sound accompanies each depression of the number and Enter keys. The three tone abrupt sound is repeated to instruct the player to reinsert his hand in an attempt to retrieve the prize 26.

If the player's guess is still not within five hundred numbers of the secret number, the two tone siren sound will again be generated when his hand covers the first photocell 30. If, however, his second guess is within five hundred numbers but not within two hundred numbers of the secret number, the player will be able to move his hand over the first photocell 30. However, when his hand covers the light impinging on the second photocell 31, the two tone siren will occur again. As shown in FIG. 1, a legend is provided adjacent each of the photocells 30–34 indicating the corresponding range of error between the player's guess and the secret number for each of the photocells 30–34.

From the foregoing discussion it is apparent that as the user's guess approaches the secret number, he may move his hand closer to the prize 26 before the siren sound will be generated. Thus when the player's guess is within one hundred numbers of the secret number, he may now move his hand past the first, second and third photocells 30, 31 and 32, respectively, and the siren sound will only be generated when his hand reaches the fourth photocell 33. If the player's guess is within ten numbers of the secret number, he may move his hand until it covers the fifth and last photocell 34 adjacent the prize 26. When the player's hand covers the photocell 34, and if his guess is greater than, but within ten numbers of the secret number, a high pitched tone buzz will be generated by the speaker 38. If the player's guess is less than the secret number, a low pitched tone buzz will be generated by the speaker 38. Thus the frequency of the tone directs the player to make his next guess in a direction which will approach the secret number.

If the player enters the secret number as his next guess, he may move his hand within the opening 28 and retrieve the prize 26. When his hand covers the photocell 34, a winning tune is generated by the speaker 38 and the light 24 is turned on. The player may remove the prize 26 from the cover 16 as evidence of this triumph. In the preferred embodiment, the winning tune is a bar from the song "We're in the money." If the player wishes to play a second game he must move the switch 20 to the Off position and then back to the Random position. This action resets the logic circuitry within the game 10 and causes a new random number to be selected as the secret number.

An alternate mode of operation of the electronic guessing game 10 may be selected when two players are available. In this instance the first player may choose the secret number to be entered into the game 10 while the second player attempts to guess the secret number. The first player may input the secret number as follows. At the beginning of the game the switch 20 is moved from the Off position to the Player position. This is as opposed to the Random position used when only a single player is available. With the switch 20 to the Player position, the light 24 is caused to blink on and off, indicating to the first player that a secret number is to be input.

The first player depresses the Clear key as evidenced by a low pitched beep sound from the speaker 38. He then inputs a secret number between one and two thousand via the ten number keys on the keyboard 18, followed by depression of the Enter key. Each of these key depressions is followed by a high pitched beep tone. When the first player depresses the Enter key, the number he has selected is stored within the electronic circuitry of the game 10 as the secret number. The secret number is, of course, entered out of sight of the second player. The light 24 is turned on by the game 10 to indicate the secret number has been entered and that it is now time for the second player to enter his first guess. At this point the remaining sequence of the game is identical to the sequence described above where the second player enters a sequence of guesses in an attempt to retrieve the prize 26.

If at any time prior to guessing the secret number, the timer within the game 10 reaches the predetermined time interval, the game is terminated and a loud brap sound, indicating a loser, is generated by the speaker 38. The light 24 is also turned on to indicate the game is over.

To begin a new game the player must move the switch 20 back to the Off position and then to either the Player or Random position as desired. From the foregoing discussion, it is to be seen that the electronic guessing game 10 provides a great deal of excitement for the players. The required hand movement toward the prize 26 in combination with the light and sound effects heightens the player interest. The fact that the player must guess the secret number in a race against time further increases player excitement.

Figure 5:
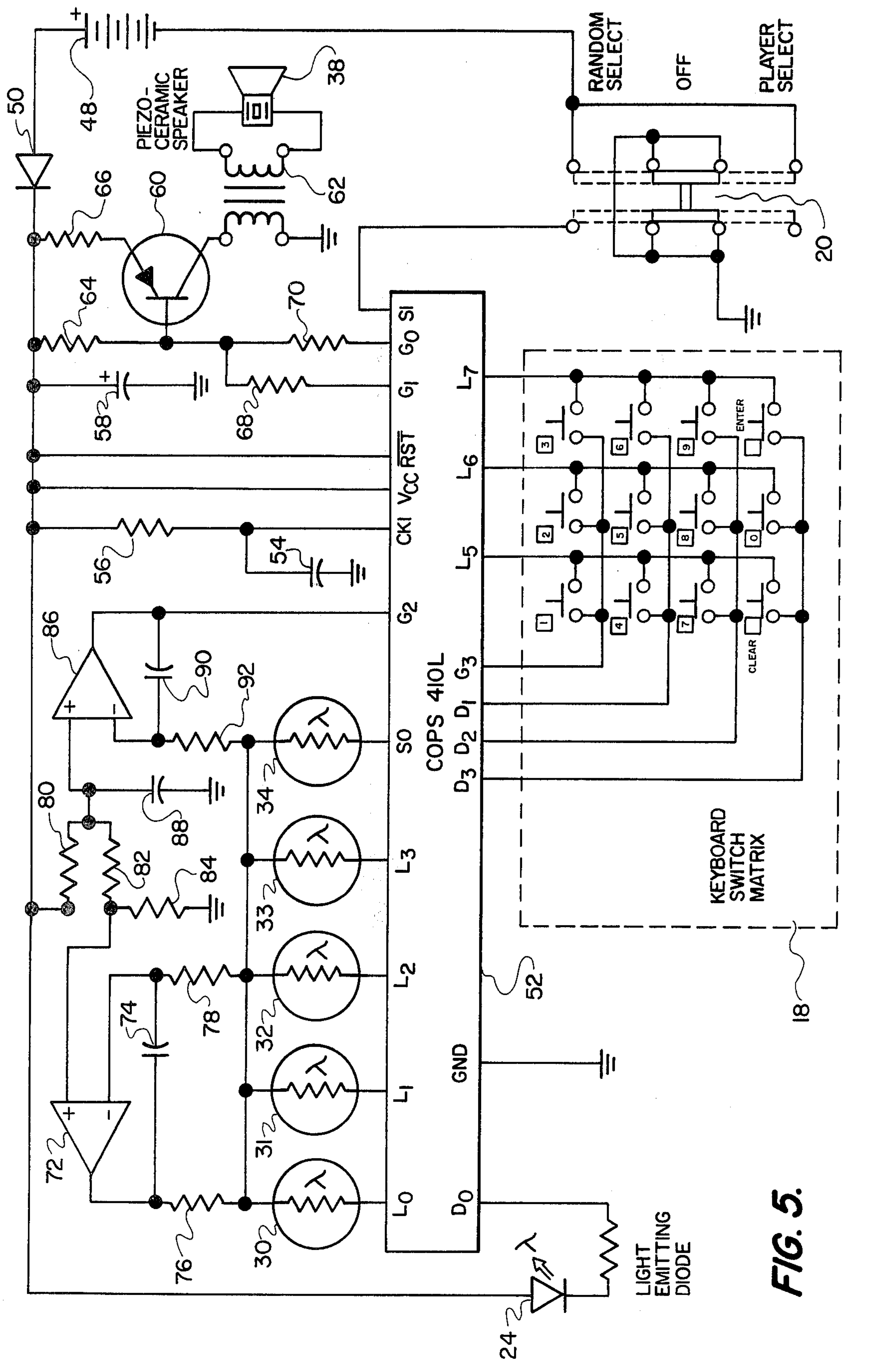
FIG. 5 is a schematic diagram of the circuitry utilized in a preferred embodiment of the invention.

Referring now to FIG. 5 there is shown a schematic diagram of a circuit which may be utilized to implement the functions of the electronic guessing game 10. As seen in FIG. 5, power is furnished to the game 10 from a battery 48 which may be a standard nine volt transistor battery. One terminal of the battery 48 is connected through a reverse polarity protection diode 50 to the $V_{CC}$ terminal of a controller 52. The other terminal of the battery 48 is connected via one pole of the switch 20 to the GND terminal of the controller 52. As shown in FIG. 5, the switch 20 is a two-pole three-position switch with the center as the Off position. With the switch 20 in either the Random select or Player select positions, the battery 48 is connected to power the electronic circuitry of the game 10. When the switch 20 is in the Random select position, terminal SI of the controller 52 is grounded, providing a signal to the controller 52 that a random number is to be generated and used as the secret number for the play of the game 10.

As will be understood by those skilled in the art, the controller 52 may be implemented in any of a number of different ways. However, as with many prior art electronic game circuits, the preferred embodiment of the invention utilizes an integrated circuit microprocessor. Such integrated circuit microprocessors are well known and include all of the input, output, memory, logic and control circuitry of a special purpose digital computer in miniature form. Various controller circuits are offered by a number of manufacturers and are well known to the prior art. A preferred embodiment of the present invention uses a COPS 410L microcontroller manufactured by National Semiconductor. The circuit is better described in the COPS USER'S MANUAL published by National Semiconductor.

Also shown in FIG. 5 are the twelve pushbutton actuated switches which make up the keyboard 18. Depression of the various keys of the keyboard 18 provide connections between output terminals $D_1$, $D_2$, $D_3$, and $G_3$, and input terminals $L_5$, $L_6$ and $L_7$ of the controller 52. A reset signal is provided at the RST terminal of the controller 52 from one terminal of the battery 48. This reset signal is used to initialize the logic circuitry within the controller 52 whenever power is first applied to the game 10. Timing pulses are provided to the controller 52 at terminal CK1 by an arrangement including a capacitor 54 and a resistor 56.

The controller 52 provides output signals at a terminal $D_0$ for operating the light 24, and at terminals $G_1$ and $G_0$ for operating the speaker 38 to provide sounds for the game 10. The circuitry including PNP transistor 60, transformer 62 and bias resistors 64, 66, 68, and 70, forms an amplifier to amplify the audio signals from the controller 52 so that high volume audio tones may be produced by the speaker 38. The values of the bias resistors 68 and 70 are chosen so that an audio signal provided at the output terminal $G_0$ produces a low volume sound by the speaker 38 and an audio signal provided at the output terminal $G_1$ of the controller 52 produces a high volume sound by the speaker 38. Thus, for example, the sounds such as the two-tone siren sound, and the loser sound may all be played at high volume while the keyboard beep tones, the three tone abrupt sound and the winning tune may be produced at low volume.

Also shown in FIG. 5 are the photocells 30–34 which are connected to the photocell select terminals $L_0$, $L_1$, $L_2$, $L_3$, and SO respectively, of the controller 52. The photocell select terminals $L_0$-$L_3$ and SO of the controller 52 are used to energize the appropriate one of the five photocells 30–34 depending on the difference between the secret number and the player's guess as described above. Only one of the five photocells 30–34 is energized at any one time.

The photocells 30–34 in the preferred embodiment are cadmium sulfide photoresistors. These devices exhibit a change in their electrical resistance as a function of the light level impinging on the cell.

Each of the photocells 30–34 are connected to a voltage regulator comprising a first operational amplifier 72, a filter capacitor 74 and bias resistors 76 and 78. A voltage reference is established for the operational amplifier 72 by means of the voltage divider comprising resistors 80, 82 and 84. This voltage regulator circuit maintains the voltage across the photocells 30–34 at approximately one volt, independent of the ambient light level impinging on the photocells 30–34. The resistor 78 and capacitor 74 are chosen to be of large value so that the voltage regulator circuit exhibits a very slow response. Thus the voltage across the photocells changes slowly to compensate for slow changes in ambient light level.

However, a rapid change in the light level striking the photocells 30–34 will produce a rapid change in voltage across the photocells. Such an abrupt change occurs when the player's hand covers one of the photocells as described above. This rapid change in voltage is detected by a voltage level detector comprising an amplifier 86, filter capacitor 90 and bias resistor 92. A reference voltage for the amplifier 86 is also provided by the voltage divider comprising the resistors 80, 82 and 84 and capacitor 88. The output of the voltage level detector circuit is connected to input terminal $G_2$ of controller 52. Accordingly, whenever the player's hand covers the photocell selected by the controller 52, an appropriate signal appears at the input terminal $G_2$ of the controller 52.

FIGS. 6–10, which interconnect with each other at the places shown in the various figures, represent a flow chart diagram of a program for controlling the controller 52 to effect the desired game play in the preferred embodiment of the present invention.

Figure 6:
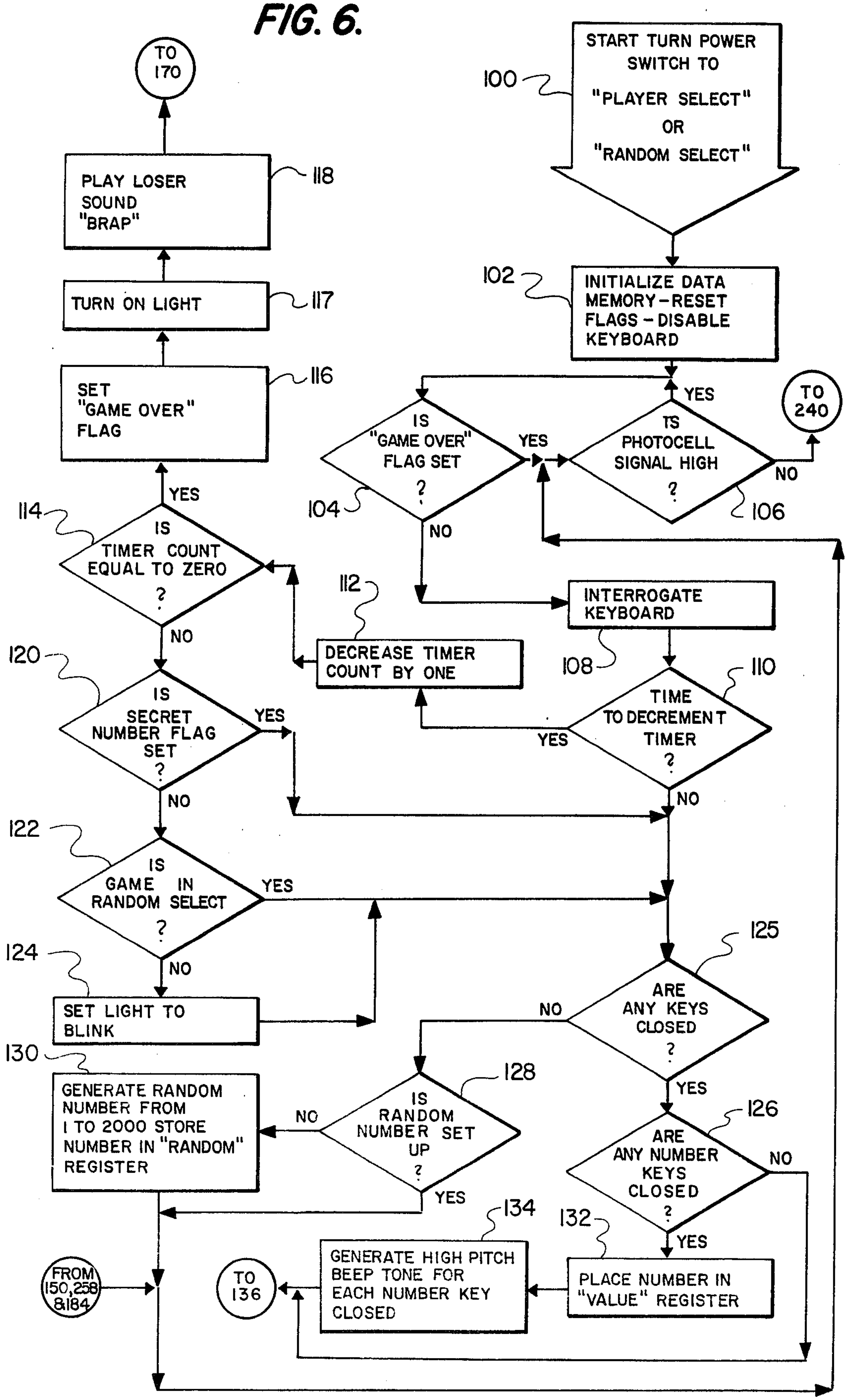
FIGS. 6–10 are flow charts showing the program and operation of the preferred embodiment of the electronic guessing game of the present invention.

Referring to FIG. 6 the program begins at step 100 when the player turns the power switch 20 to either the Player or Random positions. At step 102 the program initializes the data memory and resets the flags within the logic portion of the controller 52. The program also disables the keyboard. Disabling the keyboard prevents the player from entering any number into the memory of the controller 52. Thus actuation of any of the ten number keys of the keyboard 18 is ignored when the keyboard is disabled. As shown later in the program, only the Clear key of the keyboard 18 will be recognized when the keyboard is disabled. The program moves to step 104 to determine if the "game over" flag has been set. This flag is set when the player has lost the game or guesses the secret number. Since this is the beginning of a new game, the flag is in the reset position and the program moves to step 108.

At step 108 the program interrogates the keyboard 18 and records any key closures. Since the keyboard was disabled at step 102, the only key closure that will be recognized is the Clear key. Moving to step 110 the program decides whether it is time to decrement the game timer. As described above, the electronic guessing game 10 includes a timer which is initiated after the player enters his first guess. He must then guess the secret number before the timer reaches its predetermined time interval. After the timer has been initiated, which occurs later in the program, the program at step 110 decrements the timer at fixed intervals during the program. Thus, for example, the program may be configured to decrement the timer for every ten passes through the step 110. Since this is the first pass through step 110, the timer will not be decremented and the program will move to step 125 to determine if any keys have been closed on the keyboard 18. Assuming the player has not yet initiated the first clear command, the program moves to step 128 to see if a random number has been set up. This random number will be used as the secret number if the player has selected the random number mode of play. The program sets up a random number regardless of whether the player has selected Player select or Random number select by means of the switch 20. Since this is the first pass through the program and the random number has not been set up, the program moves to step 130.

At step 130 the program generates a random number from one to two thousand. Random number generation by a microprocessor such as controller 52 is well known to those skilled in the art. When the random number is generated, it is stored in a register labeled "random". The program then loops back from step 130 to step 106. At step 106 the program interrogates the photocell signal which appears on input line $G_2$ of the controller 52 as shown in FIG. 5. If the photocell signal is high, this indicates the player's hand is not blocking the light from any of the photocells and thus that he has not begun to retrieve the prize 26. The program moves from step 106 to step 104 and repeats the loop interrogating the keyboard.

If it is determined at step 110 that it is time to decrement the program timer, the program will move to step 112 where the timer count will be decreased by one. The timer is preset to a time interval of approximately three minutes as described later in the program. Decrementing the timer moves this preset count closer to zero. At step 114, the timer count is interrogated to see if it is equal to zero. If it is equal to zero, the player has used all of the preallotted time and has thus lost the game. The program moves to steps 116 and 117 where the "game over" flag is set and the light 24 is turned on. At step 118 the program generates a losing sound in the form of a loud "brap" through the speaker 38. The program then moves to step 170 in FIG. 8.

If it is determined at step 114 that the timer count is not equal to zero, indicating the player still has time to make plays, the program moves to step 120. At step 120, the program determines if the secret number flag is set. The secret number flag indicates that a secret number has been chosen either by the program or by a player and that it has been entered into the memory of the controller 52. Since this secret number has not yet been entered, the program moves to step 122. If the program is in Random select, indicating that the controller 52 is to use the random number as the secret number, the program moves to step 125. If the game is not in Random select, indicating that the player is to choose the secret number, the light 24 is placed in a blinking mode at step 124. The blinking light indicates to the player that he is to choose the secret number.

At step 125 the program again looks for key closures. Assuming that the player has depressed the Clear key, the program moves to step 126 to see if any number keys have been closed. Since at this time the keyboard is disabled, the number keys are ignored and the program moves from step 126 to step 136 in FIG. 7.

Figure 7:
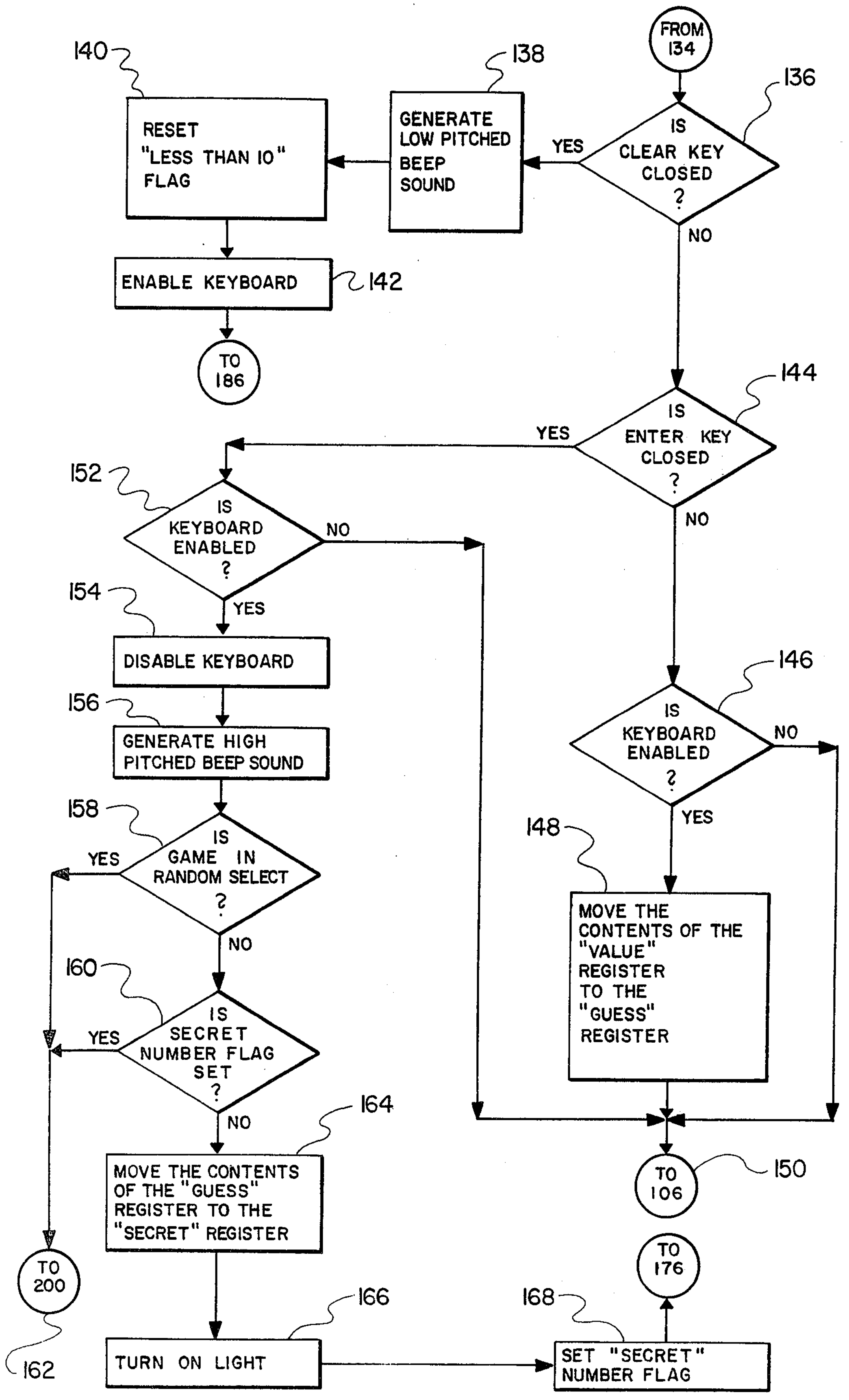

At step 136 in FIG. 7 the program looks to see if the Clear key of the keyboard 18 is closed. Assuming that this was the key depressed by the player, the program moves to step 138 to generate a low pitched beep sound, and then moves to step 140 where the "less than ten" flag is reset. As described below, the "less than ten" flag is set whenever the player's guess is within ten numbers of the secret number. Each time the Clear key is closed, indicating that a new guess is to be made, the "less than ten" flag is reset since the new guess may or may not be within ten numbers of the secret number. The program moves to step 142 where the keyboard is enabled so that the player may enter a number. The program then moves to step 186 in FIG. 8.

Figure 8:
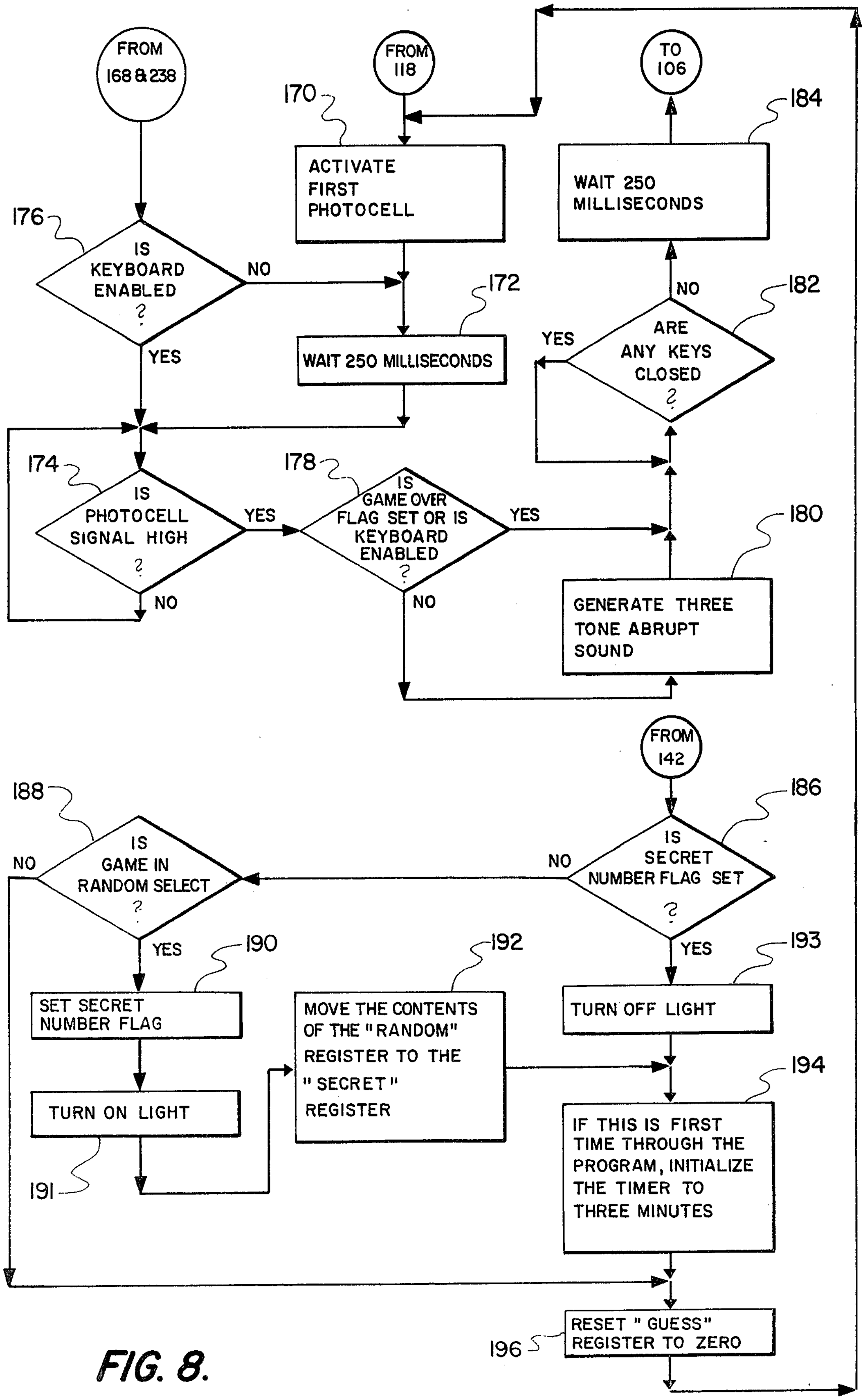

At step 186 in FIG. 8, the program determines if the secret number flag has been set. Since the secret number has not yet been chosen, the program moves to step 188 to see if the game is in random select. If the game is not in random select, the program moves to step 196. If the program is in random select, the program moves to step 190 where the secret number flag is set, to step 191 where the light 24 is turned on, and then to step 192 where the contents of the "random" register are moved to the "secret" register. At previous step 130, the random number generated by the controller 52 was stored in the "random" register. Thus at step 192 the random number is moved to the "secret" register where it will be used as the secret number for the game.

The program moves to step 194 where the timer is initialized to the predetermined time duration of three minutes if this is the first time through the program. The program then moves to step 196 where the "guess" register is reset to zero. The "guess" register is used to store the number chosen by the player as his guess. Each time the Clear key is closed the "guess" register to reset to zero so that a new guess may be entered. The program moves to step 170 in FIG. 8 where the first photocell 30 is activated by the controller 52 to prevent the player from reaching for the prize 26 before the guess is entered.

As described above, the photocells in the preferred embodiment are of the cadmium sulfide photoresistor type. These types of photocells exhibit relatively long delay times in their responses to changes in light level. To account for these delay times, the program includes steps 172 and 174. Step 172 has a two hundred fifty millisecond waiting time to allow the photocell to achieve a stable reading. The following step 174 is an additional waiting time where the program remains in a loop until the photocell signal to the controller 52 reverts to the high state. As described above, when the photocell signal is high this indicates that the player's hand is not blocking the light to the photocell. When the photocells are clear of any light blockage and have achieved a stable condition, the program moves to step 178.

At step 178 the program determines if the "game over" flag has been set or if the keyboard is enabled. Since the game is not yet over the keyboard was enabled at prior step 142 the program moves to step 182. At step 182 the program again interrogates the keyboard to see if any keys are closed. Steps 182 and 184 provide a waiting interval to debounce switch closures. Thus at step 182 the program remains in a loop until keys are opened and at step 184 an additional two hundred and fifth millisecond waiting time is provided to insure that switch closures are completely debounced. The program then returns to the beginning of the program loop at step 106 in FIG. 6.

At step 106 in FIG. 6, the program again looks to see if the photocell signal is high, indicating the player's hand has not begun to retrieve the prize 26. Since this is the case, the program moves to step 104 to resume the interrogation of the keyboard as described above. At this point the keyboard has previously been enabled at step 142 and the player begins entering either the secret number if two players are to play the game, or his first guess if only one player is to play the game. When the program reaches step 126, it will detect that number keys have been closed, and will move to step 132. At step 132 the number that was input is stored in the "value" register within the controller 52. The program moves to step 134 where for each number key closed, a high pitched beep tone is generated by the speaker 38. The program then moves to step 136 in FIG. 7.

Since the player has entered numbers via the number keys, the program will move from step 136 in FIG. 7 to step 148. At step 148, the contents of the "value" register are stored in the "guess" register. The program moves at step 150 to return to the beginning of the routine at step 106 in FIG. 6. This program loop continues until the player has entered all of the digits of his first number. When the entire number has been input, the player depresses the Enter key. This triggers the program at step 144 to branch to step 152.

At step 152, since the keyboard is still enabled, the program moves to steps 154 and 156 to disable the keyboard and to generate a high pitched beep sound. At step 158 the program determines if the game is in the Random select mode. If it is in random select, the program branches to step 200 in FIG. 9. If the game is in the Player select mode, the program moves to step 160 to see if the secret number flag has been set. The secret number flag will only have been set previously at step 190 if the game was in the Random select mode. Accordingly, the program will move from step 160 to step 164. At step 164 the contents of the "guess" register are moved to the "secret" register. Thus at step 164 the player's first entry is selected as being the secret number. This number is moved to the "secret" register and becomes the secret number to be used in the game play. At step 166 the light 24 is turned on indicating the program has stored a secret number. Moving to step 168 the program sets the secret number flag and then moves to step 176 in FIG. 8.

At step 176 in FIG. 8, the program determines whether the keyboard is enabled. Since the keyboard was previously disabled at step 154, the program moves to step 172. As described above, the steps 172,174, 178, 180, 182 and 184 are used to establish waiting times to stabilize the photocells and to debounce switch closure from the keyboard 18. The program then returns to step 106 in FIG. 6.

The program described thus far repeats a loop until the player has entered his first guess at the secret number. After he has entered his first guess and pressed the Enter key, the program moves from step 144 to step 162 in FIG. 7. At step 162 the program branches to step 200 in FIG. 9 to determine the error between the player's guess and the secret number.

Figure 9:
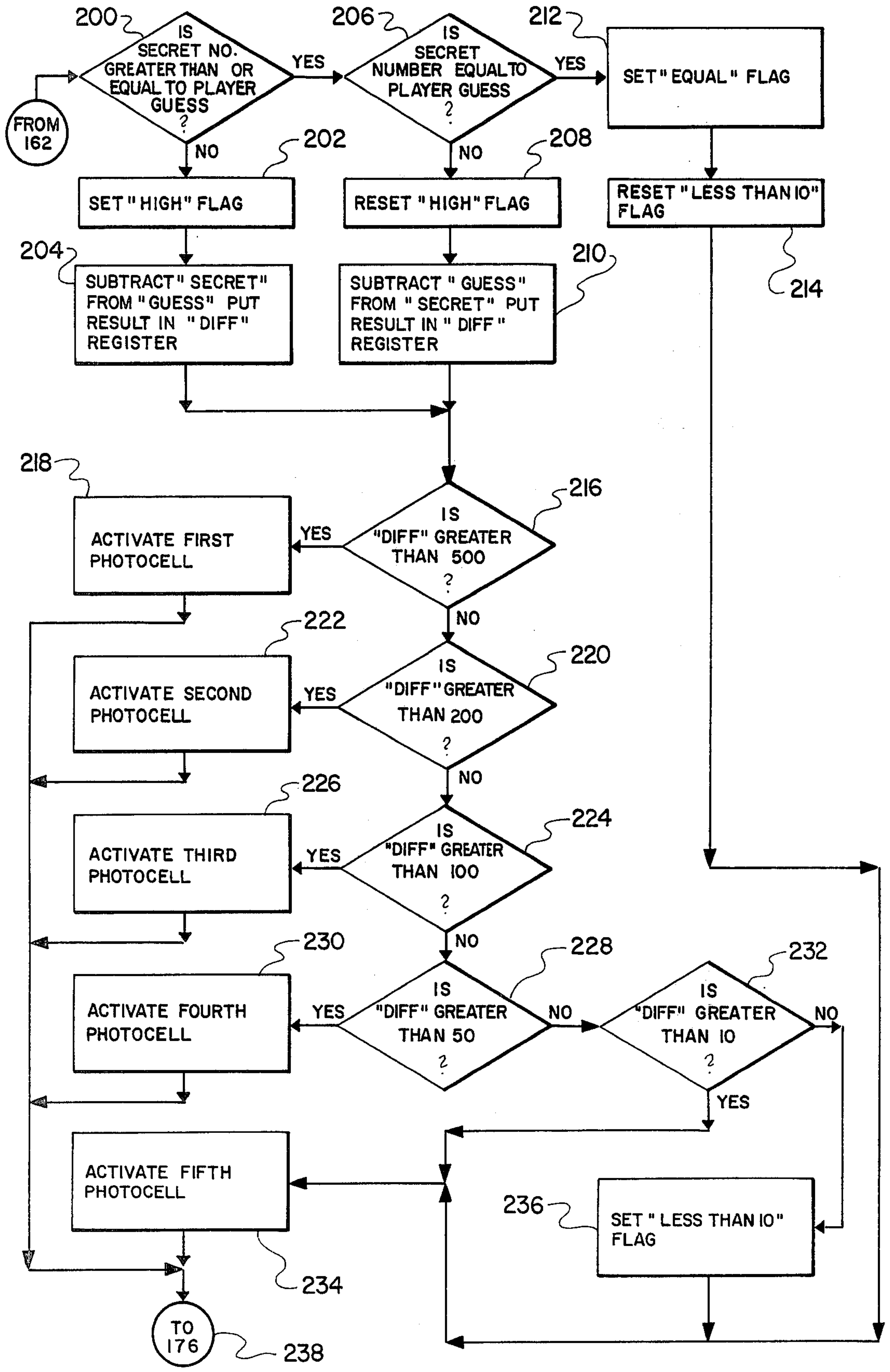

At step 200 in FIG. 9, the program determines if the secret number is greater than or equal to the player's guess. If it is not, the program moves to step 202 where the "high" flag is set indicating that the player's guess is higher in value than the secret number. At step 204 the program subtracts the secret number from the guess and places the results in the "diff" register. Thus "diff" represents the difference between the secret number and the guess. The program then moves to step 216.

If it was determined at step 200 that the secret number was greater than or equal to the player's guess, the program moves to step 206 to determine if the secret number is equal to the player's guess. If it is not, the program moves to step 208 where the "high" flag is reset indicating that the player's guess is not greater than the secret number, but is, in fact, less than the secret number. At step 210 the guess is subtracted from the secret number to determine the difference which is then stored in the "diff" register. The program again moves to step 216.

At step 216 the program examines the value in the "diff" register to determine if it is greater than five hundred. If the difference is greater than five hundred, the program moves to step 218 to activate the first photocell 30. Referring back to FIG. 1, it can be seen that the photocell 30 detects errors between the player's guess and the secret number which are in excess of five hundred. Returning now to FIG. 9, if the difference is not greater than five hundred, the program moves from step 216 to step 220 to determine if the difference is greater than two hundred. If it is, the program moves to step 222 to activate the second photocell 31.

In like manner, if the difference is not greater than two hundred, the program moves to step 224 to see if the difference is greater than one hundred. If it is, the third photocell 32 is activated at step 226. If the difference is not greater than one hundred, the program moves to step 228 to see if the difference is greater than fifty. If it is, then at step 230 the fourth photocell 30 is energized. Finally, at step 232, if the difference is greater than ten, the program moves to step 234 to turn on the fifth and last photocell 34. If the difference is not greater than ten, the program moves from step 232 to step 236 where the "less than ten" flag is set to indicate that the player's guess is within ten numbers of the secret number. The program then moves to step 234 to turn on the last photocell 34.

At step 206 in FIG. 9, if the secret number is equal to the player's guess, the program moves from step 206 to step 212 where the "equal" flag is set. The program moves to step 214 where the "less than ten" flag is reset and then to step 234 where the fifth or last photocell 34 is activated. In summary, the program shown in FIG. 9 determines which photocell 30–34 is to be activated as a function of the difference between the player's guess and the secret number. The program in FIG. 9 then exits at step 238 to return to step 176 in FIG. 8.

The program moves through steps 176, 172, 174, 178, 180, 182 and 184 in FIG. 8 as previously described. It should be noted that since the keyboard has been disabled, the program will branch from step 178 to step 180, generating a three-tone abrupt sound from the speaker 38. This is an indication to the player that the game 10 is ready for him to reach within the transparent cover 16 to attempt to retrieve the prize 26. The program returns to step 106 in FIG. 6.

At step 106 in FIG. 6, assuming that the player has moved his hand within the opening 28 of the cover 16, the photocell signal will be detected as low because the player's hand covers the photocell previously activated in the program. Thus at step 106 the program will branch to step 240 in FIG. 10.

Figure 10:
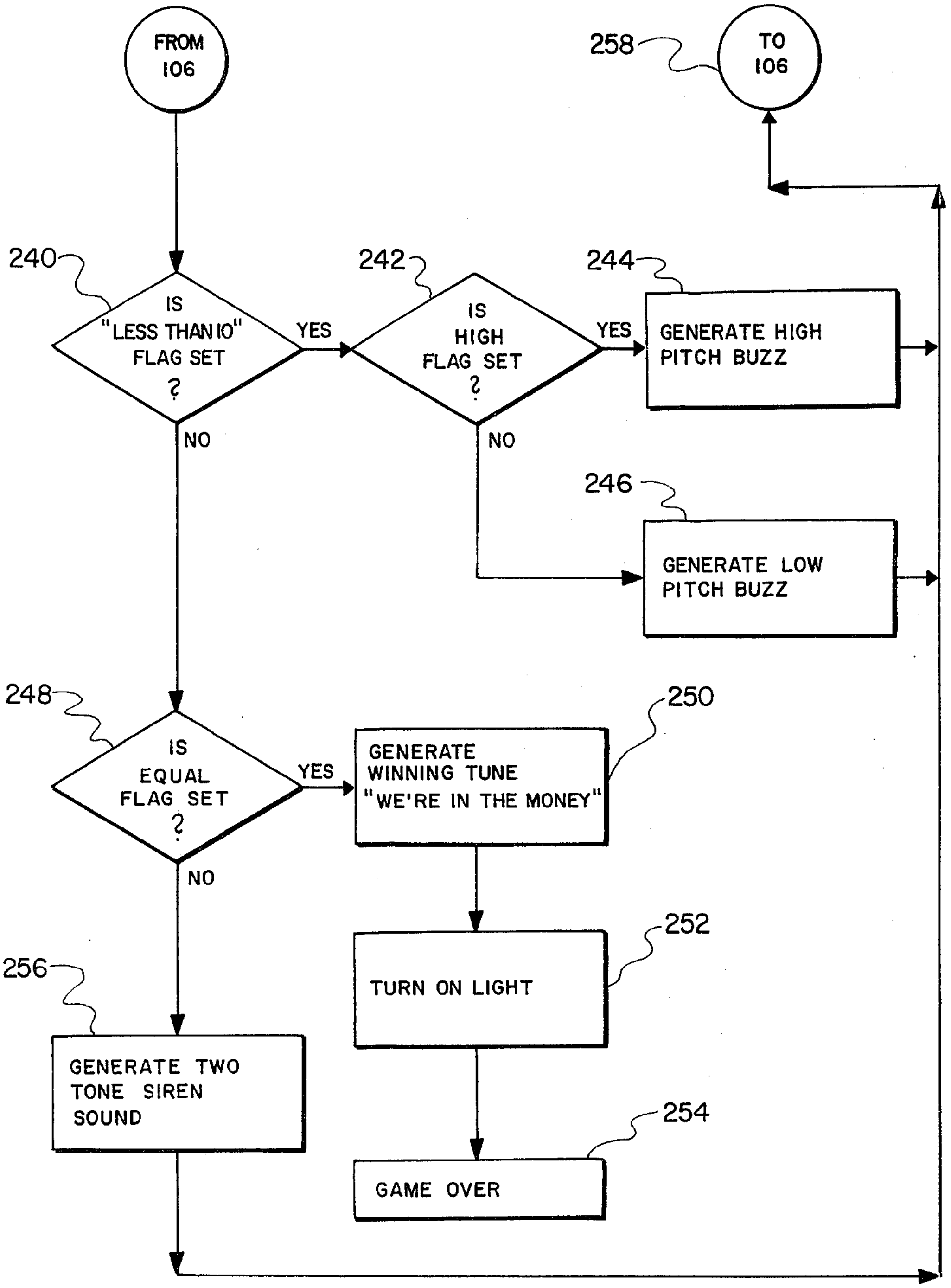

At step 240 in FIG. 10 the program determines if the "less than ten" flag has been set. This flag is previously set at step 206 only if the difference between the player's guess and the secret number is less than ten. Assuming that this is not the case, the program moves to step 248 to see if the "equal" flag is set. This flag is set only if the player's guess is the secret number as determined at step 212. If the "equal" flag is not set, then the program moves from step 248 to step 256 where the program generates a two-tone siren sound. This indicates that the player's guess is in error and is not the secret number. This two-tone siren sound is thus generated whenever the player's hand covers the appropriate photocell is activated by the program in FIG. 9.

By correlating the siren sound with the placement of his hand, the player is made aware of the magnitude of the difference between his guess and the secret number from the legend adjacent the appropriate photocell 30–34 as shown in FIG. 1. The program then moves from step 256 to step 258 where it returns to the beginning of the routine at step 106.

The program described above is repeated until either the timer counts to zero at step 114 causing the player to lose the game, or the player eventually guesses the secret number. Returning to FIG. 10 and assuming the player's guess is within ten numbers of the secret number, the program branches from step 240 to step 242 to determine if the "high" flag is set. Recall that the "high" flag is set at step 202 if the player's guess is greater than the secret number and the "high" flag is reset if the player's guess is less than the secret number. Thus, depending on the state of the "high" flag, the program branches to either step 244 or 246 generating either a high pitched buzz sound or a low pitched buzz sound, depending on whether the player's guess is above or below the secret number. Accordingly, the program generates a hint for the player in the form of the frequency of the generated tone to indicate the direction of his next guess. The program then returns to step 106 for the player's next guess.

If the player has guessed the secret number, the equal flag is set and the "less than ten" flag is reset at steps 212 and 214 respectively in FIG. 9. In response to these flags, the program will move from step 240 to step 248 and then to step 250 in FIG. 10. At step 250 the program outputs a winning tune "We're in the money" moves to step 252 to turn on the light 24 and finally to step 254 where the "game over" flag is set. The player may now retrieve the prize 26 and begin a new game by resetting the power switch 20 to Off and then to either the Player select or Random select positions. This action causes the program to be reinitialized at step 100 in FIG. 6.

As will be understood by those skilled in the art, many different programs may be utilized to implement the flow chart disclosed in FIGS. 6–10. Obviously, these programs will vary from one another in some degree. However, it is well within the skill of the computer programmer to provide particular programs for implementing each of the steps of the flow chart disclosed herein. It is also to be understood that various microcomputer circuits other than that selected for the preferred embodiment might be used without departing from the teaching of the invention. It is therefore to be understood that because various other embodiments may be devised by those skilled in the art without departing from the spirit and scope of the invention, it is the intent of the inventors to be limited only by the scope of the claims appended hereto.

What is claimed is:

1. An electronic game comprising:

means for selecting a secret number;

means for selecting a second number as a guess to the secret number;

means for determining the magnitude of the difference between the secret number and the second number; and means for providing a signal indicative of the magnitude of the difference between the secret number and the second number, including:

a plurality of locations each of which represents a predetermined value of the magnitude of the difference between the secret number and the second number;

means enabling a player of the game to choose a location; and means for generating the signal in response both to the chosen location and to the magnitude of the difference between the secret number and the second number.

2. The game of claim 1 in which the means for selecting a secret number includes a random number generator, and the means for selecting a second number includes a keyboard to enter the second number.

3. The game of claim 1 in which the means for selecting the first number and the means for selecting the second number includes a keyboard to enter the first and second number.

4. The game of claim 1 in which the plurality of locations includes:

a series of photocells positioned in an order which represents sequentially decreasing values of the magnitude of difference between the secret number and the second number; and where the means enabling a player to choose a location includes movement of the player's hand across the series of photocells in a manner which blocks ambient light from impinging on the photocells.

5. The game of claim 1 in which the means for generating the signal includes an audio tone the frequency of which is indicative of the sign of the magnitude of the difference between the secret number and the second number.

* * * * *